US010863261B1

(12) United States Patent
Chen et al.

(10) Patent No.: US 10,863,261 B1
(45) Date of Patent: Dec. 8, 2020

(54) PORTABLE APPARATUS AND WEARABLE DEVICE

(71) Applicant: PIXART IMAGING INC., Hsin-Chu (TW)

(72) Inventors: Shih-Feng Chen, Hsin-Chu (TW); Yen-Min Chang, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

(21) Appl. No.: 16/803,371

(22) Filed: Feb. 27, 2020

(51) Int. Cl.

| H04R 1/10 | (2006.01) |
|---|---|
| G10L 25/18 | (2013.01) |
| G10L 25/51 | (2013.01) |
| H04R 3/00 | (2006.01) |
| H04R 1/08 | (2006.01) |
| G10K 11/178 | (2006.01) |
| H04R 1/40 | (2006.01) |

(52) U.S. Cl.
CPC ..... *H04R 1/1041* (2013.01); *G10K 11/17873* (2018.01); *G10L 25/18* (2013.01); *G10L 25/51* (2013.01); *H04R 1/08* (2013.01); *H04R 1/1016* (2013.01); *H04R 1/406* (2013.01); *H04R 3/005* (2013.01); *G10K 2210/1081* (2013.01); *H04R 2420/07* (2013.01)

(58) Field of Classification Search
CPC ...... H04R 1/1041; H04R 1/08; H04R 1/1016; H04R 1/406; H04R 3/005; H04R 2420/07; G10K 11/17873; G10K 2210/1081; G10L 25/18; G10L 25/51
USPC ..... 381/300, 306, 307, 309, 311, 26, 56, 57, 381/58, 320, 74, 92, 97, 98
See application file for complete search history.

(56) References Cited

U.S. PATENT DOCUMENTS

2002/0150263 A1* 10/2002 Rajan ............... H04R 3/005
381/92
2019/0208348 A1* 7/2019 Reijniers ............... H04R 3/04

* cited by examiner

*Primary Examiner* — Norman Yu
(74) *Attorney, Agent, or Firm* — Li & Cai Intellectual Property (USA) Office

(57) ABSTRACT

A wearable device and a portable apparatus are provided. The wearable device includes two wireless earphones each including a speaker, a sound receiver for receiving sound from a peripheral object, and a signal converting circuit that is electrically coupled to the sound receiver and is configured to convert input signal from the sound receiver into a target spectrogram. The two spectrograms from the signal converting circuits have a time/phase difference, and at least one wireless earphone includes a storage unit and a judging circuit that is electrically coupled to the storage unit, the two signal converting circuits, and the two speakers. The judging circuit is configured to compare any target spectrogram with basic spectrograms of the storage unit so as to determine which kind of objects the peripheral object is, and is configured to obtain an instant position of the peripheral object by the time/phase difference.

20 Claims, 5 Drawing Sheets

PORTABLE APPARATUS AND WEARABLE DEVICE

FIELD OF THE DISCLOSURE

The present disclosure relates to a wearable device, and more particularly to a portable apparatus and a wearable device each having a pair of wireless earphones.

BACKGROUND OF THE DISCLOSURE

When conventional wireless earphones are used by a user, sound emitted from the conventional wireless earphones is usually louder over that of peripheral environment around the user, so that it is difficult for the user to notice whether the peripheral environment happens a situation that affects the user's safety.

SUMMARY OF THE DISCLOSURE

In response to the above-referenced technical inadequacies, the present disclosure provides a portable apparatus and a wearable device to effectively improve the issues associated with conventional wireless earphones.

In one aspect, the present disclosure provides a wearable device, which includes two wireless earphones configured as a pair and to be operated at the same time. Each of the two wireless earphones includes a speaker, a sound receiver, and a signal converting circuit. The sound receiver is configured to continuously receive an external sound generated from a peripheral object in movement so as to obtain an input signal. The signal converting circuit is electrically coupled to the sound receiver. The signal converting circuit is configured to convert the input signal from the sound receiver into a target spectrogram. In the wearable device, the two spectrograms respectively converted from the two signal converting circuits have a time/phase difference therebetween. At least one of the two wireless earphones includes a storage unit and a judging circuit. The storage unit has a plurality of basic spectrograms therein that respectively correspond to sounds respectively generated from different kinds of objects in movement. The judging circuit is electrically coupled to the storage unit, the two signal converting circuits, and the two speakers. The judging circuit is configured to compare any one of the two target spectrograms with the basic spectrograms so as to determine which kind of the objects the peripheral object is, and is configured to obtain an instant position of the peripheral object by the time/phase difference. When the instant position of the peripheral object is located in a predetermined region around the wearable device, the speaker of at least one of the two wireless earphones emits a warning sound.

In certain embodiments, in each of the two wireless earphones, the signal converting circuit includes an amplifying unit electrically coupled to the sound receiver, a filtering unit electrically coupled to the amplifying unit, and a converting unit that is electrically coupled to the filtering unit. The converting unit of each of the two wireless earphones is electrically coupled to the judging circuit.

In certain embodiments, each of the sound receivers includes at least one omnidirectional microphone.

In certain embodiments, the storage unit has a visual geometry group (VGG) training model therein, and the basic spectrograms are generated by the VGG training model.

In certain embodiments, the VGG training model is configured to selectively modify the basic spectrograms according to the target spectrograms.

In certain embodiments, in each of the two wireless earphones, the speaker is configured to generate a soundwave to delete a noise that is received by the sound receiver and includes the external sound.

In certain embodiments, the objects include a car, a motorcycle, a bicycle, and a runner.

In certain embodiments, the two wireless earphones are defined to be operated at a horizontal plane, the predetermined region has a detecting angle in the horizontal plane with respect to a center point between the two wireless earphones, and the detecting angle is less than 300 degrees.

In certain embodiments, the predetermined region is located at an invisible region of user's eyes.

In certain embodiments, the judging circuit is configured to obtain a velocity and an orientation of the peripheral object by the time/phase difference.

In another aspect, the present disclosure provides a portable apparatus, which includes a wearable device and a smart phone. The wearable device has two wireless earphones that are configured as a pair and to be operated at the same time. Each of the two wireless earphones includes a speaker, a sound receiver, and a signal converting circuit. The he sound receiver is configured to continuously receive an external sound generated from a peripheral object in movement so as to obtain an input signal. The signal converting circuit is electrically coupled to the sound receiver. The signal converting circuit is configured to convert the input signal from the sound receiver into a target spectrogram. In the wearable device, the two spectrograms respectively converted from the two signal converting circuits have a time/phase difference there-between. The smart phone is wirelessly connected to the two wireless earphones and includes a storage unit and a judging circuit. The storage unit has a plurality of basic spectrograms therein that respectively correspond to sounds respectively generated from different kinds of objects in movement. The judging circuit is electrically coupled to the storage unit, the two signal converting circuits, and the two speakers. The judging circuit is configured to compare any one of the two target spectrograms with the basic spectrograms so as to determine which kind of the objects the peripheral object is, and is configured to obtain an instant position of the peripheral object by the time/phase difference. When the instant position of the peripheral object is located in a predetermined region around the wearable device, the speaker of at least one of the two wireless earphones emits a warning sound.

In certain embodiments, in each of the two wireless earphones, the signal converting circuit includes an amplifying unit electrically coupled to the sound receiver, a filtering unit electrically coupled to the amplifying unit, and a converting unit that is electrically coupled to the filtering unit. The converting unit of each of the two wireless earphones is electrically coupled to the judging circuit.

In certain embodiments, each of the sound receivers includes at least one omnidirectional microphone.

In certain embodiments, the storage unit has a visual geometry group (VGG) training model therein, and the basic spectrograms are generated by the VGG training model.

In certain embodiments, the VGG training model is configured to selectively modify the basic spectrograms according to the target spectrograms.

In certain embodiments, in each of the two wireless earphones, the speaker is configured to generate a soundwave to delete a noise that is received by the sound receiver and includes the external sound.

In certain embodiments, the objects include a car, a motorcycle, a bicycle, and a runner.

In certain embodiments, the two wireless earphones are defined to be operated at a horizontal plane, the predetermined region has a detecting angle in the horizontal plane with respect to a center point between the two wireless earphones, and the detecting angle is less than 300 degrees.

In certain embodiments, the predetermined region is located at an invisible region of user's eyes.

In certain embodiments, the judging circuit is configured to obtain a velocity and an orientation of the peripheral object by the time/phase difference.

Therefore, when the user wears the two wireless earphones of the present disclosure to listen music, the wearable device (or the portable apparatus) can immediately provide a warning signal when the user's surroundings may affect safety, thereby increasing the security of the wearable device (or the portable apparatus) in use.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
FIG. 1 is a schematic view showing an operation of a wearable device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
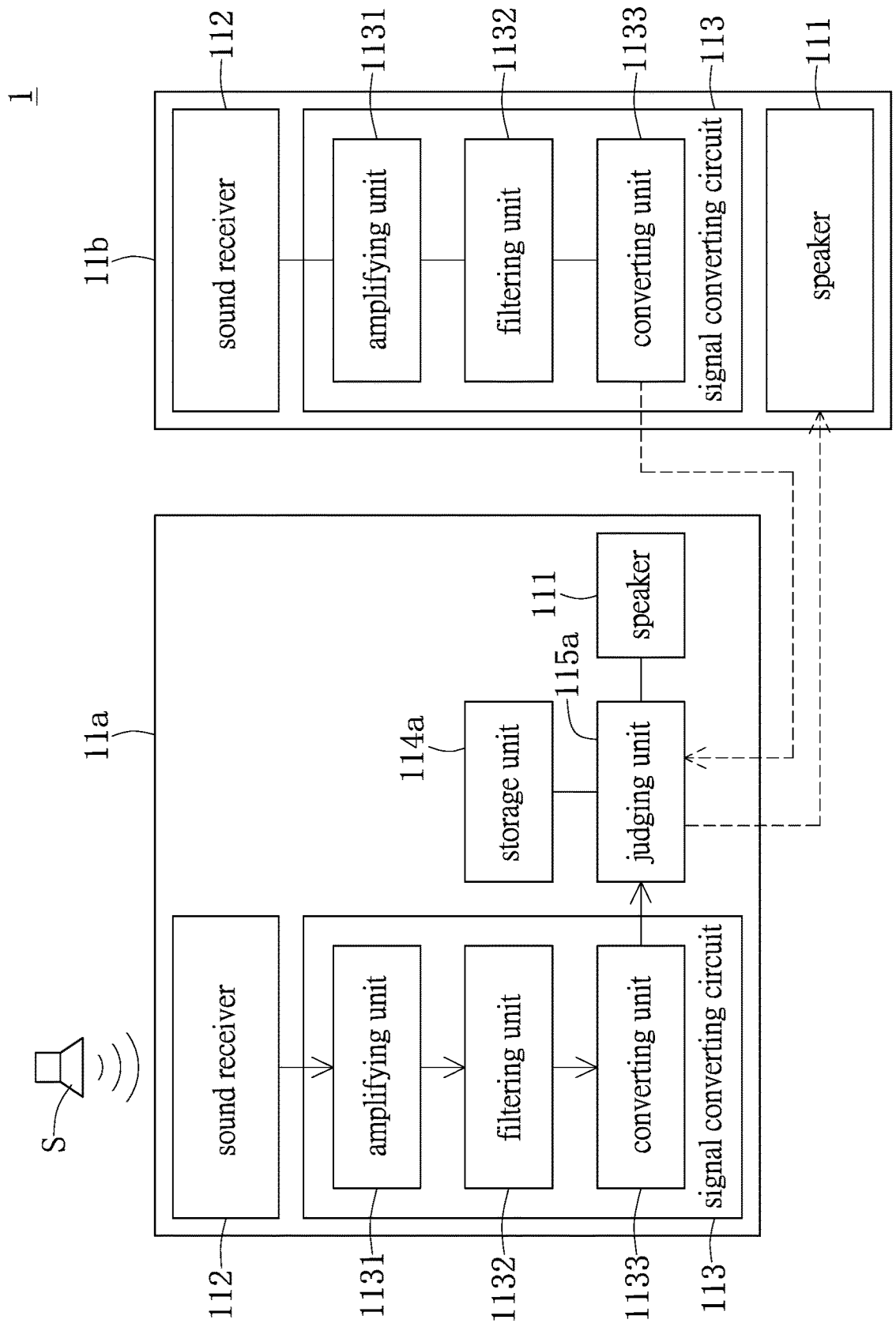
FIG. 2 is a functional block view of the wearable device according to the first embodiment of the present disclosure.
Figure 3:
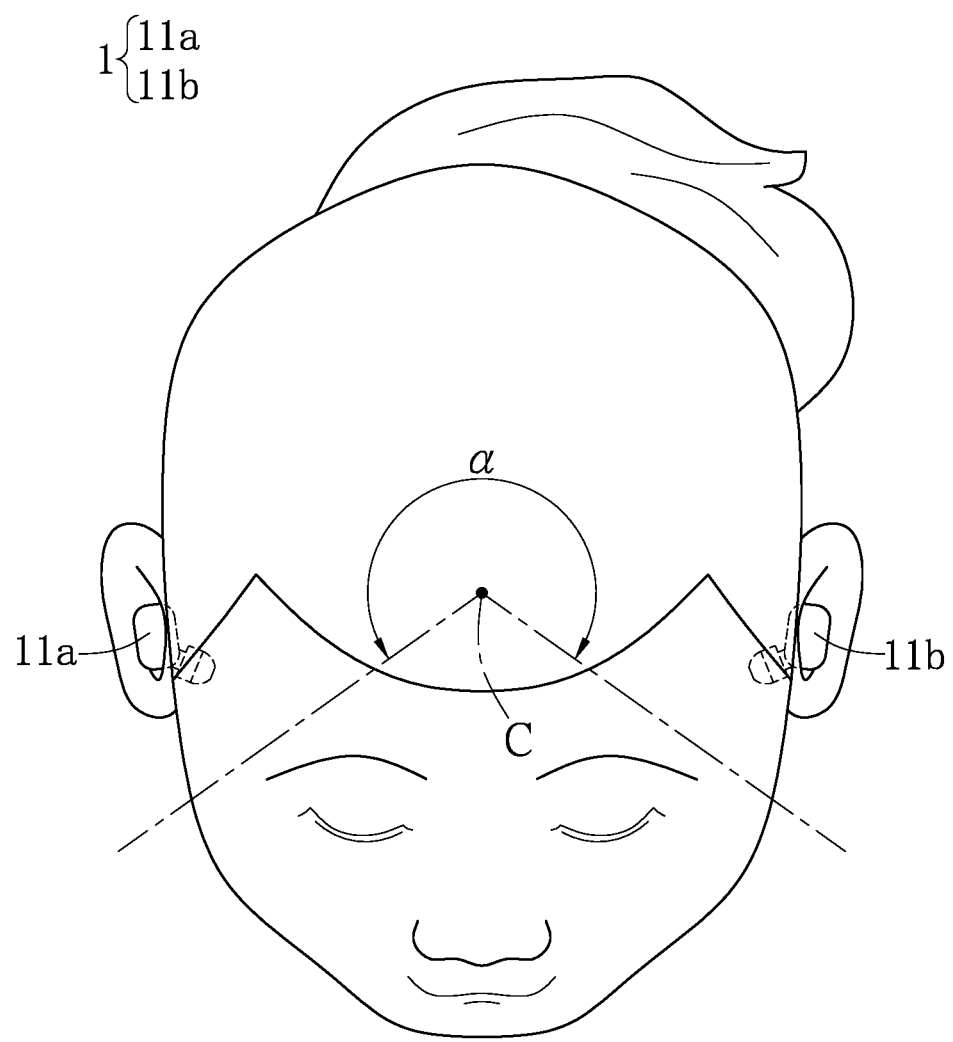
FIG. 3 is a top view showing the operation of the wearable device according to the first embodiment of the present disclosure.

Referring to FIG. 1 to FIG. 3, a first embodiment of the present disclosure provides a wearable device 1 that includes two wireless earphones 11a, 11b configured as a pair and to be operated at the same time. In other words, any earphones having a wire or any wireless earphones not be operated at the same time are different from the two wireless earphones 11a, 11b (or the wearable device 1) of the present embodiment.

Each of the two wireless earphones 11a, 11b includes a speaker 111, a sound receiver 112, and a signal converting circuit 113 that is electrically coupled to the sound receiver 112. However, in other embodiments of the present disclosure, the wireless earphone 11a, 11b can include other components according to design requirements.

As the speaker 111, the sound receiver 112, and the signal converting circuit 113 of the two wireless earphones 11a, 11b are of the same structure, the following description describes the structure of the speaker 111, the sound receiver 112, and the signal converting circuit 113 of just one of the two wireless earphones 11a, 11b for the sake of brevity, but the present disclosure is not limited thereto. For example, in other embodiments of the present disclosure, the speaker 111, the sound receiver 112, or the signal converting circuit 113 of the two wireless earphones 11a, 11b can be of different structure.

In the present embodiment, the speaker 111 can be used to emit sound (e.g., music) in a general operation, and the sound receiver 112 is configured to continuously receive an external sound S generated from a peripheral object O in movement so as to obtain an input signal. Moreover, the peripheral object O in the present embodiment can emit a predictable or general sound. For example, the peripheral object O can be a car, a motorcycle, a bicycle, or a runner.

Specifically, the speaker 111 is configured to generate a soundwave to delete a noise that is received by the sound receiver 112 and includes the external sound S. In other words, the speaker 111 allows a user to only hear the sound (e.g., music) in the general operation, but the present disclosure is not limited thereto. For example, in other embodiments of the present disclosure, the speaker 111 can be provided without deleting the noise.

Moreover, the sound receiver 112 can obtain the input signal according to the external sound S before the speaker deletes the noise. In the present embodiment, the sound receiver 112 can include at least one omnidirectional microphone, but the present disclosure is not limited thereto. For example, in other embodiments of the present disclosure, the sound receiver 112 can include at least one directional microphone or a microphone array according to design requirements.

The signal converting circuit 113 is electrically coupled to the sound receiver 112, and the signal converting circuit 113 is configured to convert the input signal from the sound receiver 112 into a target spectrogram. It should be noted that different sounds respectively have different acoustic features, and a difference between different acoustic features is not easily found according to waveforms in time domain mapped by the different sounds, so that the waveforms in time domain need to be converted into spectrums in frequency domain for finding the difference between different acoustic features. In other words, the difference between different acoustic features is only shown in the spectrums in frequency domain.

In the present embodiment, when the sound receiver 112 receives the external sound S, the sound receiver 112 also receives other irrelevant noise, and an output voltage of the sound receiver 112 is small, so that a sound signal received by the sound receiver 112 is not easily to distinguish the external sound S from the irrelevant noise. Accordingly, the signal converting circuit 113 in the present embodiment includes an amplifying unit 1131 electrically coupled to the sound receiver 112, a filtering unit 1132 electrically coupled to the amplifying unit 1131, and a converting unit 1133 that is electrically coupled to the filtering unit 1132.

Specifically, after the sound receiver 112 receives the sound signal, the signal converting circuit 113 can amplify the sound signal through the amplifying unit 1131 (e.g., a second-order amplifier circuit). Moreover, the sound signal is amplified, and the noise is also amplified together, so that the signal converting circuit 113 can filter unnecessary noise through the filtering unit 1132 (e.g., a band-pass filter formed by a high-pass filter and a low-pass filter). Accordingly, the signal converting circuit 113 can convert the sound signal, which is filtered by the filtering unit 1132, into the target spectrogram through the converting unit 1133.

In the wearable device 1, the two wireless earphones 11a, 11b are respectively worn on the user's ears, so that the two spectrograms respectively converted from the two signal converting circuits 113 have a time/phase difference therebetween.

Specifically, in the present embodiment, one of the two wireless earphones 11a includes a storage unit 114a and a judging unit 115a, but the present disclosure is not limited thereto. For example, in other embodiments of the present disclosure, each of the two wireless earphones 11a, 11b can include a storage unit 114a and a judging unit 115a; or, the storage unit 114a and the judging unit 115a are respectively arranged in the two wireless earphones 11a, 11b. Accordingly, in the wearable device 1 of the present disclosure, at least one of the two wireless earphones 11a, 11b includes the storage unit 114a and the judging unit 115a.

The storage unit 114a has a visual geometry group (VGG) training model therein, and has a plurality of basic spectrograms therein. The basic spectrograms respectively correspond to sounds respectively generated from different kinds of objects (e.g., a car, a motorcycle, a bicycle, and a runner) in movement, and the basic spectrograms can be generated by the VGG training model. Specifically, the VGG training model is configured to selectively modify the basic spectrograms according to the target spectrograms, but the present disclosure is not limited thereto. For example, in other embodiments of the present disclosure, the storage unit 114a can be provided without the VGG training model.

The judging unit 115a is electrically coupled to the storage unit 114a, the two signal converting circuits 113, and the two speakers 111. The judging unit 115a is electrically coupled to the converting unit 1133 of each of the two wireless earphones 11a, 11b, so that the judging circuit 115a is configured to compare any one of the two target spectrograms with the basic spectrograms so as to determine which kind of the objects the peripheral object O is.

For example, the judging unit 115a can compare the target spectrogram with any one of the basic spectrograms so as to obtain a likelihood value, and the judging unit 115a further chooses a largest one from the likelihood values those greater than a predetermined value (e.g., 85%), so that the judging unit 115a can determine that the peripheral object O is the kind of the object corresponding to the basic spectrogram that is related to the largest likelihood value. Specifically, if the likelihood values obtained by comparing the target spectrogram with the basic spectrograms respectively corresponding to a car, a motorcycle, a bicycle, and a runner are 90%, 95%, 80%, and 60%, the two likelihood values of 90% and 95% are greater than the predetermined value (e.g., 85%), and the likelihood value of 95% is the largest one, so that judging unit 115a can determine that the peripheral object O is the motorcycle.

Moreover, the judging unit 115a can be configured to obtain an instant position of the peripheral object O (e.g., a velocity and an orientation of the peripheral object O) by the time/phase difference. For example, the external sound S can reach the two sound receivers 112 at a time difference that can be calculated by the judging unit 115a, and the instant position of the peripheral object O can be obtained by a geometric relationship of the external sound S and the two sound receivers 112.

Specifically, when the instant position of the peripheral object O is located in a predetermined region R around the wearable device 1, the judging unit 115a allows the speaker 111 of at least one the two wireless earphones 11a, 11b to emit a warning sound. It should be noted that the predetermined region R in the present embodiment is not a fixed value and can be changed according to the kind or velocity of the peripheral object O. For example, the predetermined region R when the peripheral object O is a car is larger than the predetermined region R when the peripheral object O is a bicycle. In addition, when the velocity of the peripheral object O is faster, the corresponding predetermined region R is larger.

Accordingly, when the user wears the two wireless earphones 11a, 11b to listen music, the wearable device 1 can immediately provide a warning signal when the user's surroundings may affect safety, thereby increasing the security of the wearable device 1 in use.

The sound receiver 112 of the two wireless earphones 11a, 11b in the present embodiment are defined to be operated at a horizontal plane, the predetermined region R has a detecting angle α in the horizontal plane with respect to a center point C between the two wireless earphones 11a, 11b, and the detecting angle α is less than 300 degrees and is preferably located at an invisible region of user's eyes.

Second Embodiment

Figure 4:
FIG. 4 is a schematic view showing an operation of a portable apparatus according to a second embodiment of the present disclosure.
Figure 5:
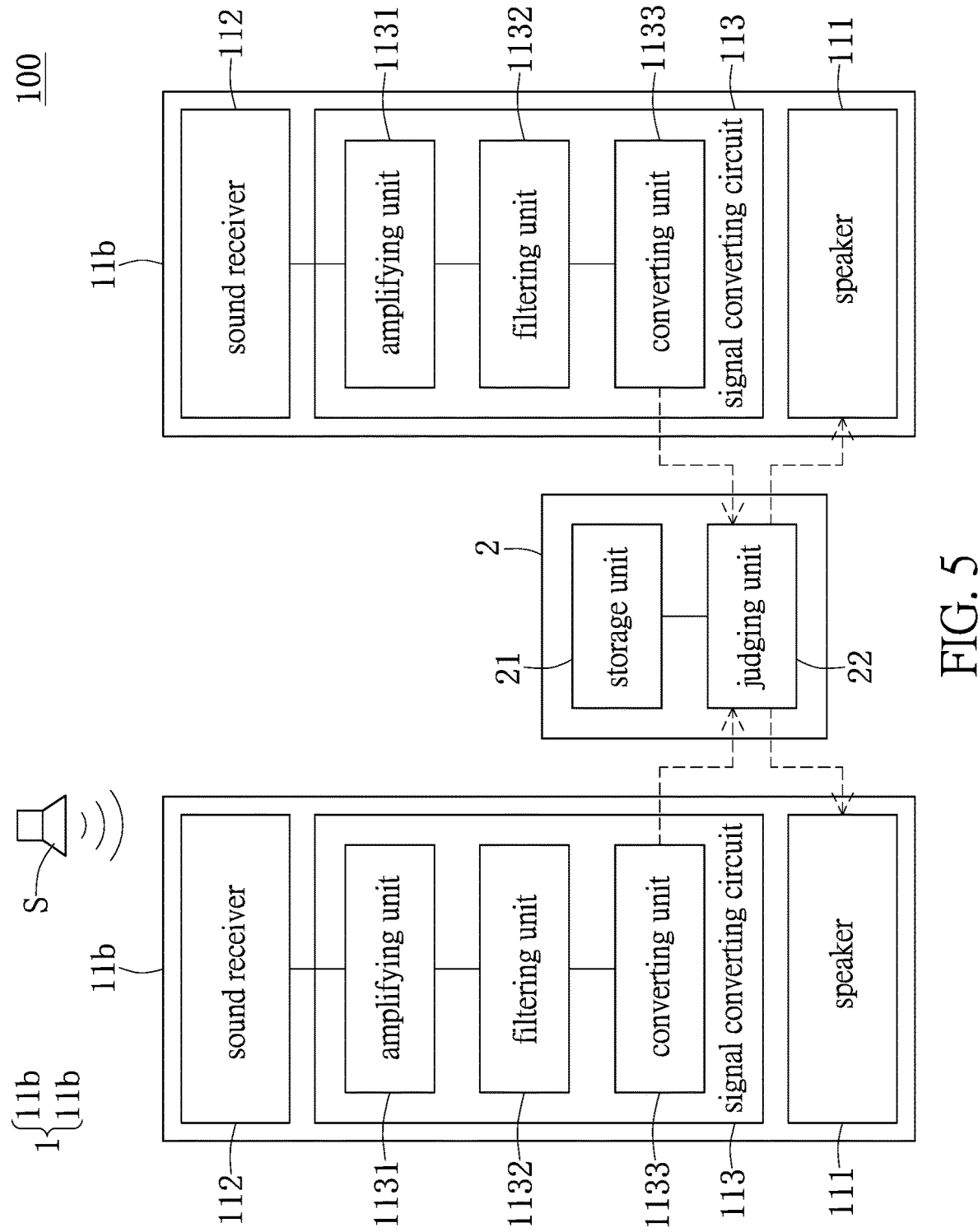
FIG. 5 is a functional block view of the portable apparatus according to the second embodiment of the present disclosure.

Referring to FIG. 4 and FIG. 5, a second embodiment of the present disclosure is similar to the first embodiment of the present disclosure. For the sake of brevity, descriptions of the same components in the first and second embodiments of the present disclosure will be omitted, and the following description only discloses different features between the first and second embodiments.

The present embodiment of the present disclosure provides a portable apparatus 100, which includes a wearable device 1 and a smart phone 2. The wearable device 1 includes two wireless earphones 11b configured as a pair and to be operated at the same time, and each of the two wireless earphones 11b includes a speaker 111, a sound receiver 112, and a signal converting circuit 113 electrically coupled to the sound receiver 112. The speaker 111, the sound receiver 112, and the signal converting circuit 113 of the wireless earphone 11b in the present embodiment are similar to that in the first embodiment so that descriptions of speaker 111, the sound receiver 112, and the signal converting circuit 113 in the present embodiment are omitted for the sake of brevity. Moreover, each of the two wireless earphones 11b in the present embodiment is provided without the storage unit 114a and the judging unit 115a of the first embodiment.

The smart phone 2 is wirelessly connected to the two wireless earphones 11b, and the smart phone 2 includes a storage unit 21 and a judging unit 22. The storage unit 21 and the judging unit 22 in the present embodiment can be existing components built in the smart phone 2, so that the smart phone 2 is not need to add new components, but the present disclosure is not limited thereto. Moreover, functions of the storage unit 21 and the judging unit 22 in the present embodiment are identical to that of the storage unit 21 and the judging unit 22 in the first embodiment, so that descriptions of the storage unit 21 and the judging unit 22 in the present embodiment are omitted for the sake of brevity.

In conclusion, when the user wears the two wireless earphones of the present disclosure to listen music, the wearable device (or the portable apparatus) can immediately provide a warning signal when the user's surroundings may affect safety, thereby increasing the security of the wearable device (or the portable apparatus) in use.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A wearable device, comprising:
two wireless earphones configured as a pair and to be operated at the same time, wherein each of the two wireless earphones includes:
a speaker and a sound receiver, wherein the sound receiver is configured to continuously receive an external sound generated from a peripheral object in movement so as to obtain an input signal; and
a signal converting circuit electrically coupled to the sound receiver, wherein the signal converting circuit is configured to convert the input signal from the sound receiver into a target spectrogram,
wherein in the wearable device, the two spectrograms respectively converted from the two signal converting circuits have a time/phase difference there-between, and wherein at least one of the two wireless earphones includes:
a storage unit having a plurality of basic spectrograms therein that respectively correspond to sounds respectively generated from different kinds of objects in movement; and
a judging circuit electrically coupled to the storage unit, the two signal converting circuits, and the two speakers, wherein the judging circuit is configured to compare any one of the two target spectrograms with the basic spectrograms so as to determine which kind of the objects the peripheral object is, and is configured to obtain an instant position of the peripheral object by the time/phase difference, and
wherein when the instant position of the peripheral object is located in a predetermined region around the wearable device, the speaker of at least one of the two wireless earphones emits a warning sound.

2. The wearable device according to claim 1, wherein in each of the two wireless earphones, the signal converting circuit includes an amplifying unit electrically coupled to the sound receiver, a filtering unit electrically coupled to the amplifying unit, and a converting unit that is electrically coupled to the filtering unit, and wherein the converting unit of each of the two wireless earphones is electrically coupled to the judging circuit.

3. The wearable device according to claim 1, wherein each of the sound receivers includes at least one omnidirectional microphone.

4. The wearable device according to claim 1, wherein the storage unit has a visual geometry group (VGG) training model therein, and the basic spectrograms are generated by the VGG training model.

5. The wearable device according to claim 4, wherein the VGG training model is configured to selectively modify the basic spectrograms according to the target spectrograms.

6. The wearable device according to claim 1, wherein in each of the two wireless earphones, the speaker is configured to generate a soundwave to delete a noise that is received by the sound receiver and includes the external sound.

7. The wearable device according to claim 1, wherein the objects include a car, a motorcycle, a bicycle, and a runner.

8. The wearable device according to claim 1, wherein the two wireless earphones are defined to be operated at a horizontal plane, the predetermined region has a detecting angle in the horizontal plane with respect to a center point between the two wireless earphones, and the detecting angle is less than 300 degrees.

9. The wearable device according to claim 8, wherein the predetermined region is located at an invisible region of user's eyes.

10. The wearable device according to claim 8, wherein the judging circuit is configured to obtain a velocity and an orientation of the peripheral object by the time/phase difference.

11. A portable apparatus, comprising:
a wearable device having two wireless earphones that are configured as a pair and to be operated at the same time, wherein each of the two wireless earphones includes:
a speaker and a sound receiver, wherein the sound receiver is configured to continuously receive an external sound generated from a peripheral object in movement so as to obtain an input signal; and
a signal converting circuit electrically coupled to the sound receiver, wherein the signal converting circuit is configured to convert the input signal from the sound receiver into a target spectrogram,
wherein in the wearable device, the two spectrograms respectively converted from the two signal converting circuits have a time/phase difference there-between, and
a smart phone wirelessly connected to the two wireless earphones and including:
a storage unit having a plurality of basic spectrograms therein that respectively correspond to sounds respectively generated from different kinds of objects in movement; and a judging circuit electrically coupled to the storage unit, the two signal converting circuits, and the two speakers, wherein the judging circuit is configured to compare any one of the two target spectrograms with the basic spectrograms so as to determine which kind of the objects the peripheral object is, and is configured to obtain an instant position of the peripheral object by the time/phase difference, wherein when the instant position of the peripheral object is located in a predetermined region around the wearable device, the speaker of at least one of the two wireless earphones emits a warning sound.

12. The portable apparatus according to claim 11, wherein in each of the two wireless earphones, the signal converting circuit includes an amplifying unit electrically coupled to the sound receiver, a filtering unit electrically coupled to the amplifying unit, and a converting unit that is electrically coupled to the filtering unit, and wherein the converting unit of each of the two wireless earphones is electrically coupled to the judging circuit.

13. The portable apparatus according to claim 11, wherein each of the sound receivers includes at least one omnidirectional microphone.

14. The portable apparatus according to claim 11, wherein the storage unit has a visual geometry group (VGG) training model therein, and the basic spectrograms are generated by the VGG training model.

15. The portable apparatus according to claim 14, wherein the VGG training model is configured to selectively modify the basic spectrograms according to the target spectrograms.

16. The portable apparatus according to claim 11, wherein in each of the two wireless earphones, the speaker is configured to generate a soundwave to delete a noise that is received by the sound receiver and includes the external sound.

17. The portable apparatus according to claim 11, wherein the objects include a car, a motorcycle, a bicycle, and a runner.

18. The portable apparatus according to claim 11, wherein the two wireless earphones are defined to be operated at a horizontal plane, the predetermined region has a detecting angle in the horizontal plane with respect to a center point between the two wireless earphones, and the detecting angle is less than 300 degrees.

19. The portable apparatus according to claim 18, wherein the predetermined region is located at an invisible region of user's eyes.

20. The portable apparatus according to claim 18, wherein the judging circuit is configured to obtain a velocity and an orientation of the peripheral object by the time/phase difference.

* * * * *